(12) United States Patent
Woodell et al.

(10) Patent No.: US 8,643,533 B1
(45) Date of Patent: Feb. 4, 2014

(54) ALTITUDE SENSOR SYSTEM

(75) Inventors: Daniel L. Woodell, Cedar Rapids, IA (US); Richard D. Jinkins, Rewey, WI (US); Richard M. Rademaker, Rijswijk (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 446 days.

(21) Appl. No.: 12/892,563

(22) Filed: Sep. 28, 2010

(51) Int. Cl.
*G01S 13/95* (2006.01)

(52) U.S. Cl.
USPC ......... 342/26 B; 342/26 R; 342/118; 342/121

(58) Field of Classification Search
USPC ....... 342/25 R–25 F, 26 B, 26 R, 29, 65, 120, 342/123, 142
See application file for complete search history.

(56) References Cited

U.S. PATENT DOCUMENTS

| | | | |
|---|---|---|---|
| 3,071,766 A * | 1/1963 | Fenn | 342/65 |
| 4,595,925 A * | 6/1986 | Hansen | 342/123 |
| 5,828,332 A * | 10/1998 | Frederick | 342/26 B |
| 6,389,354 B1 * | 5/2002 | Hicks et al. | 701/514 |
| 6,424,288 B1 | 7/2002 | Woodell | |
| 6,427,122 B1 * | 7/2002 | Lin | 701/472 |
| 6,593,875 B2 * | 7/2003 | Bergin et al. | 342/121 |
| 6,603,425 B1 | 8/2003 | Woodell | |
| 7,145,501 B1 * | 12/2006 | Manfred et al. | 342/120 |
| 2008/0074308 A1 * | 3/2008 | Becker et al. | 342/120 |

* cited by examiner

*Primary Examiner* — John B Sotomayor
*Assistant Examiner* — Marcus Windrich
(74) *Attorney, Agent, or Firm* — Donna P. Suchy; Daniel M. Barbieri

(57) ABSTRACT

A weather radar system improves electronics for receiving radar returns. The weather radar system determines an altitude above ground level using return data derived from the weather radar returns. The weather radar system can utilize movement data related to movement of the aircraft to calculate the altitude. In addition, the weather radar system can utilize previous calculations of the altitude to determine the current altitude underneath the aircraft. The weather radar system can reduce the need for a radio altimeter.

20 Claims, 7 Drawing Sheets

ALTITUDE SENSOR SYSTEM

BACKGROUND

This application relates altitude detection. More particularly, this application relates to altitude detection systems and methods.

Radio altimeters have been used to detect the altitude of an aircraft. Radio altimeters can provide altitude data for ground proximity warning systems, reactive wind shear systems, and supplemental information during the final stages of landing/touchdown. The altitude data generally is representative of the distance along a perpendicular line beneath the aircraft to the ground. The addition of a radio altimeter on an aircraft forces the consideration of the required volume, weight, power, reliability, and cost of the altimeter sensor function. Further, antennae for radio altimeters typically require that holes be provided through the fuselage.

Weather radar systems are known in the art for detecting and displaying severe weather to a crew in an aircraft on a two-dimensional map display showing range, bearing, and intensity of a detected weather system, which may be convective or stratiform in nature. Flight hazards due to weather conditions are primarily the result of precipitation and turbulence. Airborne weather radar systems have modes of operation that have been optimized to detect rain or wet precipitation. Other modes of operation include ground mapping where the radar has been optimized to produce a two-dimensional display of ground terrain in front or around the aircraft. Furthermore, other radar modes may be included that are optimized to produce terrain height estimations. These estimations may be used and presented to the flight crew in various ways.

Accordingly, there is a need for a less expensive system and method of determining altitude of an aircraft above local ground level. There is also a need for a system and method of determining altitude that does not require additional holes in the fuselage and minimizes the volume, weight, power, reliability allocation, and cost of generating the altitude estimate. Further, there is a need for a system for and method of determining altitude that does not utilize a radio altimeter. Yet further, there is a need for an on-board avionic weather radar system which can be utilized to determine altitude. Further still, there is a need for determining altitude using an avionic system that is existing on the aircraft for a different function. Yet further still, there is a need for an avionic system that can be used to confirm if the radio altimeter data or other altitude data is accurate.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the above-mentioned needs.

SUMMARY

An exemplary embodiment relates to a weather radar system. The weather radar system is on-board an aircraft. The weather radar system includes electronics for receiving radar returns and determining an altitude above ground level of the aircraft using return data derived from the radar returns.

Another exemplary embodiment relates to a method of detecting an altitude of an aircraft. The method includes the steps of receiving radar returns using a weather radar system, and determining ground parameters relating to the radar returns. The ground parameters are related to an angle and a range to ground. The method also includes determining movement parameters related to movement of the aircraft, and calculating the altitude using the angle to ground, the range to ground and the movement parameters.

Another exemplary embodiment relates to an apparatus including receiving weather radar returns and means for determining a first factor and a second factor from the weather radar returns. The means for determining calculates an altitude of the aircraft from the first factor and the second factor.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Referring generally to the figures, systems and methods for altitude detection with an aircraft-mounted weather radar system is described. A weather radar system (e.g., an avionic weather radar on-board an aircraft) is generally configured to project radar beams and to receive radar returns relating to the projected radar beams. Using the return data, processing electronics associated with the weather radar system can determine the presence of weather (e.g., rain) and hazards and can determine an angle and range to ground. Advantageously, the weather radar system is configured to determine altitude of the aircraft. To provide adequate radar coverage for detecting weather, the weather radar system is configured to sweep the radar beam. The weather radar system can be configured to conduct at least one vertical sweep during the sweep. The vertical sweep can be used to detect the angle and the range to ground for an altitude calculation. According to one embodiment, the systems and methods described herein allow altitude to be determined without the use of a radio altimeter. Alternatively, the systems and methods can be used with a radio altimeter to confirm readings. In other embodiments, horizontal radar sweeps may be used instead of or in addition to vertical sweeps.

Figure 1:
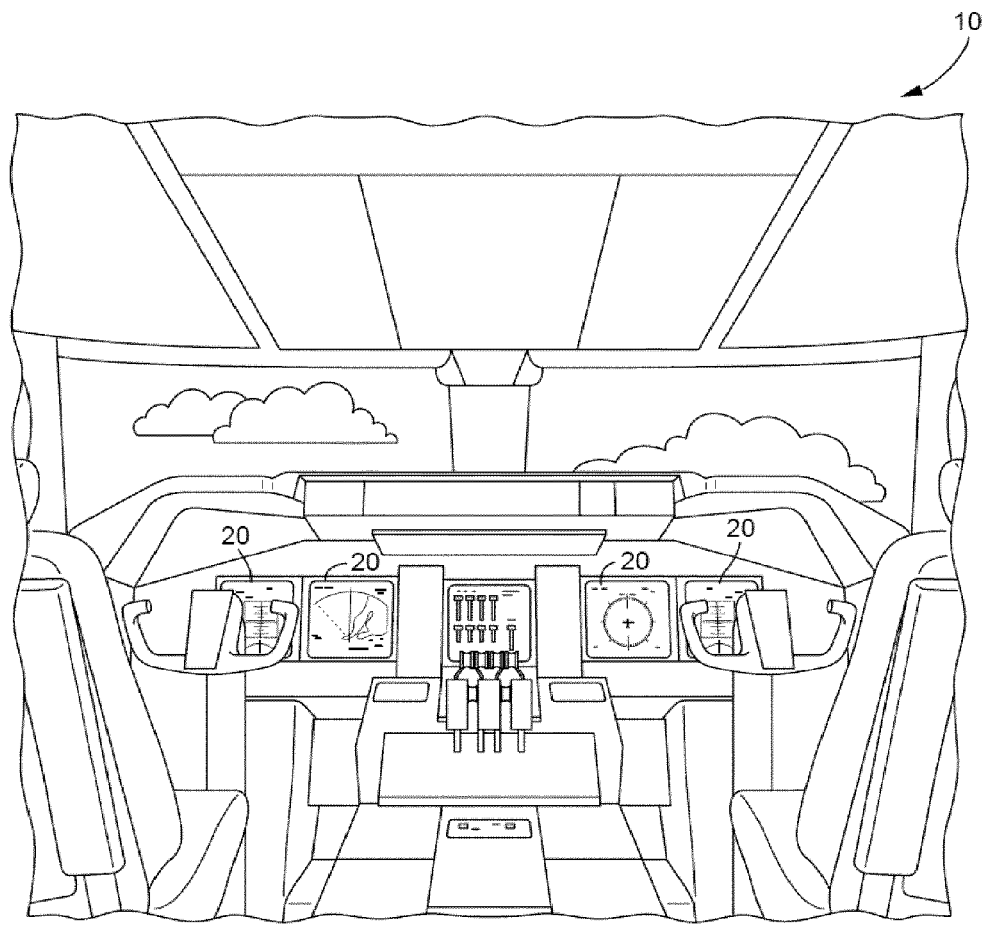
FIG. 1 is a perspective view schematic illustration of an aircraft control center, according to an exemplary embodiment.

Referring now to FIG. 1, an illustration of an aircraft, control center, or cockpit 10 is shown, according to an exemplary embodiment. Aircraft 5 includes flight displays 20 which are generally used to increase visual range and to enhance decision-making abilities. In an exemplary embodiment, flight displays 20 may provide an output from a weather radar system of the aircraft. For example, flight displays 20 may provide a top-down view, a horizontal view, or any other view of weather and/or terrain detected by a radar system on the aircraft. In a preferred embodiment, displays 20 provide an indication of altitude from the weather radar system. The views of weather and/or terrain may include monochrome or color graphical representations of the weather and/or the terrain. Graphical representations of weather or terrain may include an indication of altitude of those objects or the altitude relative to the aircraft. Aircraft control center 10 may further include Terrain Awareness and Warning System (TAWS) user interface elements (flashing lights, displays, display elements on a weather radar display, display elements on a terrain display, audio alerting devices, etc.) configured to warn the pilot of potentially threatening terrain features. The TAWS system may be configured to, for example, give the pilots of the aircraft a "pull up" indication (e.g., audibly, visually, etc.) when terrain is detected within an altitude of danger to the aircraft.

Figure 2:
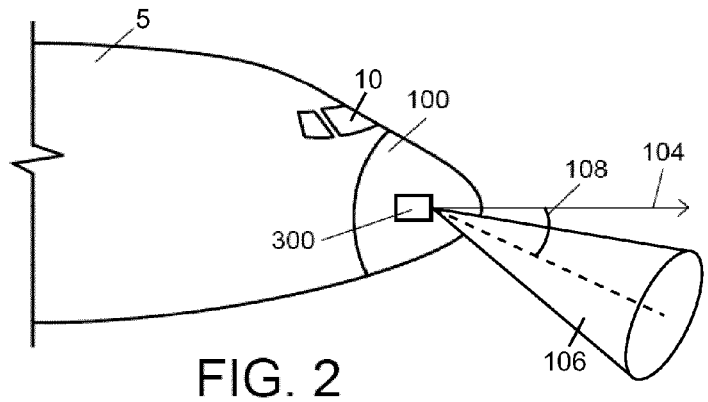
FIG. 2 is a schematic planar side view illustration of the nose of an aircraft including a weather radar system, according to an exemplary embodiment.

In FIG. 2, the front of aircraft 5 is shown including control center 10 and a nose 100, according to an exemplary embodiment. A weather radar system 300 (e.g., MultiScan™ system, monopulse radar system, or sequential lobing radar system) is generally located within nose 100 of aircraft 5 or within aircraft control center 10. According to various exemplary embodiments, radar system 300 may be located on the top of the aircraft or on the tail of the aircraft instead. Radar system 300 may include or be coupled to an antenna system. A variety of different antennas or radar systems may be used with the present invention (e.g., a split aperture antenna, a monopulse antenna, a sequential lobing antenna, etc.).

Returns from beams 106 at different tilt angles 108 with respect to a reference 104 (e.g., representing 0 degrees tilt angle) can be electronically merged to form a composite image for display on an electronic display 20 shown, for example, in FIG. 1. Returns can also be processed to, for example, distinguish between terrain and weather, to determine the height of terrain, or to determine the height of weather. Radar system 300 may be a WXR-2100 MultiScan® radar system or similar system manufactured by Rockwell Collins, Inc. configured for an altitude determination as described herein in accordance with a preferred embodiment. According to other embodiments, radar system 300 may be an RDR-4000 system or similar system manufactured by Honeywell International, Inc. configured for an altitude determination as described herein.

Figure 3:
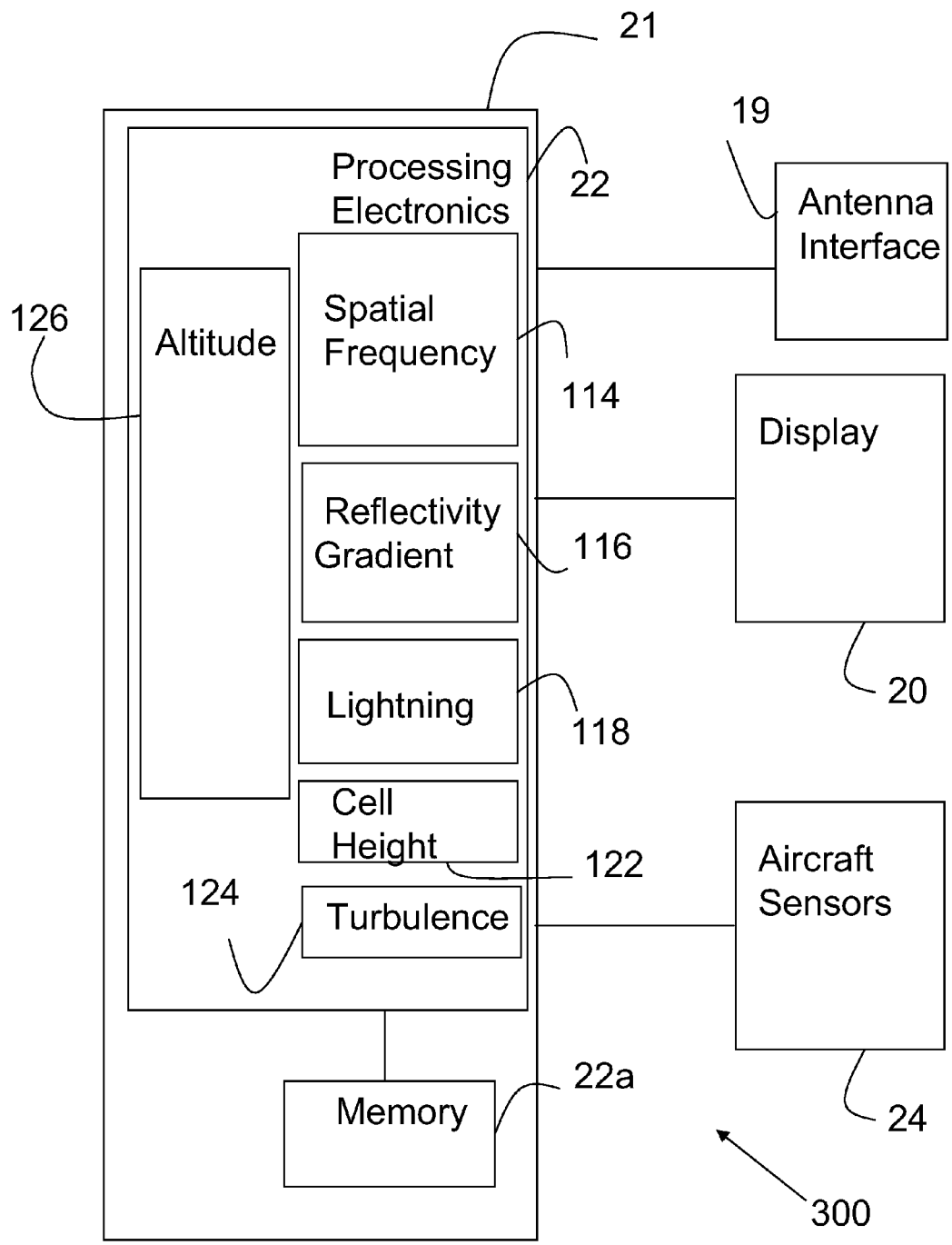
FIG. 3 is a general block diagram of a weather radar system configured for altitude determination, according to an exemplary embodiment.

Referring to FIG. 3, a block diagram of a weather radar system 300 is shown, according to an exemplary embodiment. Weather radar system 300 includes a weather radar antenna connected (e.g., directly, indirectly) to an antenna interface 19. An antenna controller and receiver/transmitter circuit may be used to move the antenna and include any number of mechanical or electrical circuitry components or modules for steering a radar beam. For example, such a circuit may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). The circuit may be configured to conduct the actual signal generation that results in a radar beam being provided from the weather radar antenna and to conduct the reception of returns received at the antenna. Radar return signals are provided to a hardware platform 21 and specifically to processing electronics 22 for processing. For example, processing electronics 22 can be configured to interpret the returns for display on one or more displays 20.

Processing electronics 22 are preferably configured via software to perform the operations described herein. Electronics 22 can be connected to aircraft sensors 24 which may generally include any number of sensors configured to provide data to processing electronics 22. For example, sensors 24 could include temperature sensors, humidity sensors, infrared sensors, altitude sensors, a gyroscope, a global positioning system (GPS), inertial navigation system (INS), altitude and heading reference system (AHRS), or any other aircraft-mounted sensors that may be used to provide data, such as movement data, to processing electronics 22. It should be appreciated that sensors 24 (or any other component shown connected to processing electronics 22) may be indirectly or directly connected to the processing electronics 22. Processing electronics 22 further be connected to avionics equipment. Avionics equipment can include a flight management system, INS, AHRS, a navigation system, a backup navigation system, or another aircraft system configured to provide inputs to processing electronics 22.

The exemplary WXR-2100 MultiScan® Weather Radar System is capable of operating in an automatic MultiScan™ system mode with processor 22 controlling the weather radar system gain and antenna tilt functions over multiple tilt settings and storing the individual scan data in a memory 22a. This scan data is continually refreshed and corrected in the memory 22a for aircraft motion by processor 22. The data sent to display 20 could be a composite of multiple scans that have been processed to remove ground clutter and refine the image. This operation optimizes the display images shown to the flight crew by showing short, mid, and long range weather targets. Exemplary weather radar operation is described in U.S. Pat. No. 6,424,288 "Multi-Sweep Method and System for Detecting and Displaying Weather Information on a Weather Radar System" by Daniel L. Woodell and U.S. Pat. No. 6,603,425 "Method and System for Suppressing Ground Clutter Returns on an Airborne Weather Radar" by Daniel L. Woodell, both patents assigned to the assignee of the present application, and incorporated herein by reference.

The operational details, thresholds, architecture, and processes of weather radar system 300 are not described in a limiting fashion and are provided as exemplary information. System 300 can be any type of single beam, multibeam or volumetric scanning system. Systems and subsystems described as circuits can utilize software to implement some or all of the described functionality.

Weather radar system 300 can include various modules for determining the presence of weather and weather hazards. For example, a spatial frequency module 114, a reflectivity gradient module 116, a lightning detection module 118, a cell height module 122, and a turbulence detection module 124 can be included to detect various types of weather and weather hazards by processing weather radar returns from antenna interface 19. In one embodiment, processor or processing electronics 22 includes an altitude detection module 126 which advantageously determines altitude of aircraft 5 using data from weather radar returns.

Figure 8:
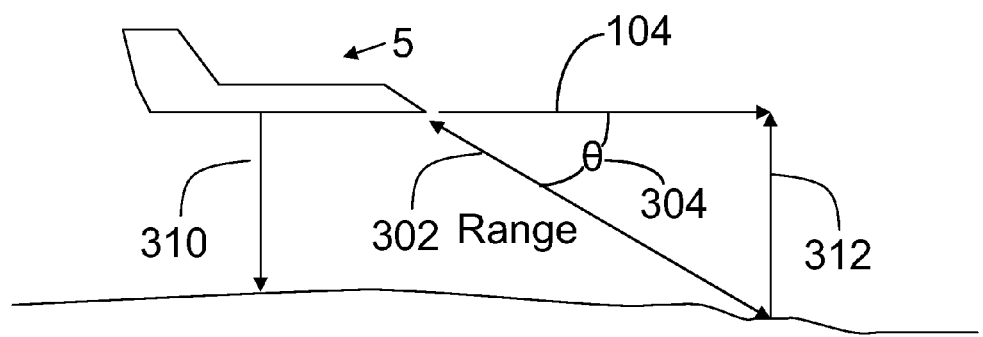
FIG. 8 is an illustration of an aircraft above ground using the weather radar system illustrated in FIG. 3 for altitude determination according to an exemplary embodiment.

With reference to FIG. 8, altitude module 126 (FIG. 3), receives weather radar returns and determines an angle theta 304 and a range 302 to ground using beam 106. Using geometry, an altitude 312 can be calculated once theta 304 and range 302 are determined. The theta and range parameters are determined by providing radar beam 106 scanned vertically so that it at least partially strikes the ground. The theta parameter 304 is determined by determining the vertical scan angle when the returns indicate that the ground is detected. Alternatively, the theta parameter may be generated from data taken from horizontal antenna movement when the radar beam strikes the ground. Theta 304 can be determined based on heading, scan angle, and depression angle to the terrain.

The range parameter 302 is determined by determining the duration it takes for the radar signals to return back to the radar when the returns indicated that those returns are associated with detection of the ground. Module 126 determines that the beam 106 has struck the ground by analyzing the signals returned from the radar sweep (e.g., the energy, phase, etc.). Various weather radar return processing techniques can be used to determine range and determine when beam 106 strikes the ground.

Altitude 312 is in front of the aircraft and is not necessarily the same as altitude 310 directly beneath the aircraft. System 300 determines altitude 310 by measuring altitude 310 at locations surrounding aircraft 5. Altitude module 126 can utilize previous measurements of altitude 312 to approximate altitude 310. For example, altitude module 126 can adjust the measurement of altitude 312 to account for the vertical movement of aircraft 5 between the location where 310 is determined and the aircraft location where 312 was measured. This adjustment is in accordance with vertical and/or horizontal movements of the aircraft (e.g., a difference in vertical and horizontal positions over time). Other exemplary embodiments could be used to determine altitude 310 from the measured altitude 321 without departing from the invention.

The calculation of relative aircraft altitude difference between the location where 310 is determined and the location where 312 was measured may be derived from many potential sources. Source examples include inertial reference system velocities or accelerations, baro altitude or GPS altitude. For example, the measurement of altitude 312 can be stored at a periodic rate, when aircraft 5 is located above the location of measured altitude 312, the baro altitude (e.g., altitude 310) may be measured at that point. The difference between the altitudes may be used as a correction factor for future measurements. In such an example, baro altitude may be substituted by acceleration measurements or INS measurements. Calculation of vertical adjustments can utilize other types of data and any other altitude determining techniques or equations may also be used.

Figure 4:
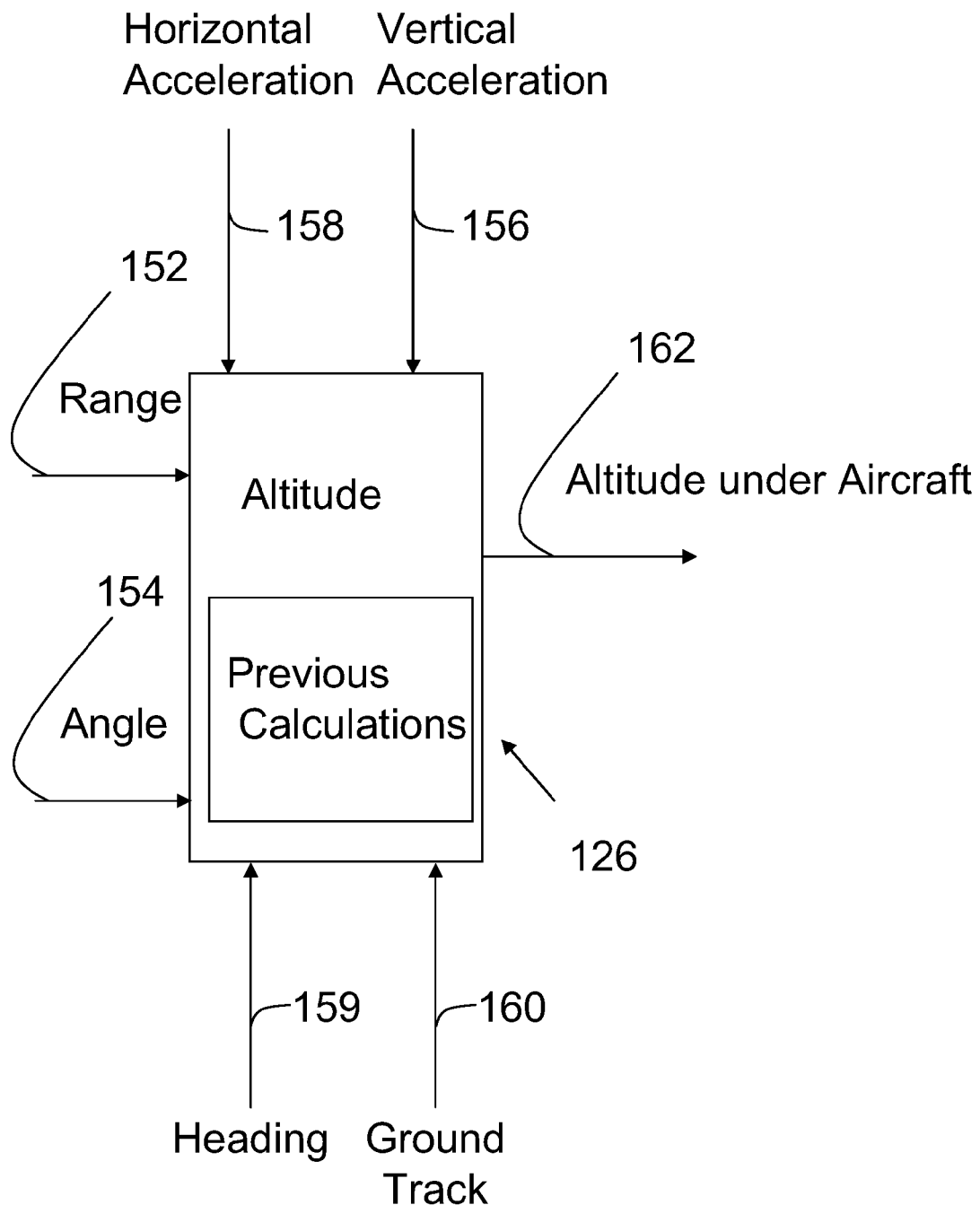
FIG. 4 is a more detailed general block diagram of the processing circuit of the weather radar system of FIG. 3, according to an exemplary embodiment.
Figure 5:
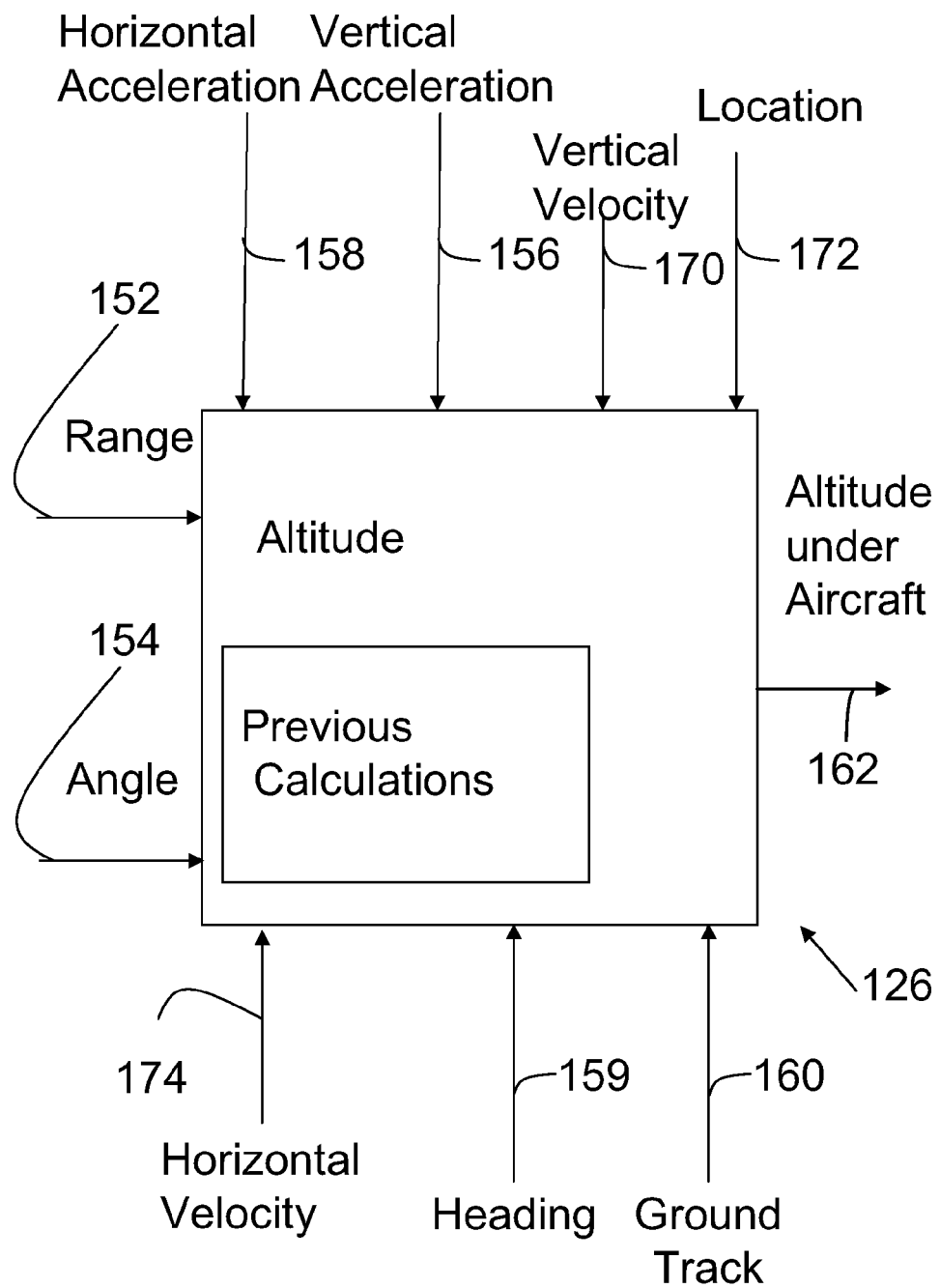
FIG. 5 is a more detailed general block diagram of the processing circuit of the weather radar system illustrated in FIG. 4 in accordance with another exemplary embodiment.

The correspondence of the current location can be determined using horizontal acceleration parameters. Altitude or range 302 can be calculated based on the known tilt angle of radar system 300 and based on a measured altitude 310. Alternatively, GPS-base location, horizontal velocity, vertical velocity, can be used for adjustments to altitude and determination of the corresponding location. FIG. 4 shows module 126 receiving horizontal and vertical parameters at inputs 156 and 158, range and angle parameters 152 and 154, and heading and ground track parameters at inputs 159 and 160. The difference in horizontal location can be computed using a history of ground speed and ground track angle. Altitude under the aircraft is provided at output 162. FIG. 5 shows module 126 additionally receiving inputs vertical velocity 170, location 172 and horizontal velocity 174.

With reference to FIG. 4, the parameters at inputs 156 and 158 can be received from other avionic systems such as an Inertial Navigation System (INS). Although shown as inputs 152, 154, 156, 158, 170, 172 and 172 and output 162, the inputs and outputs to module 126 can be simply data memory locations associated with calculating in a processor.

Figure 6:
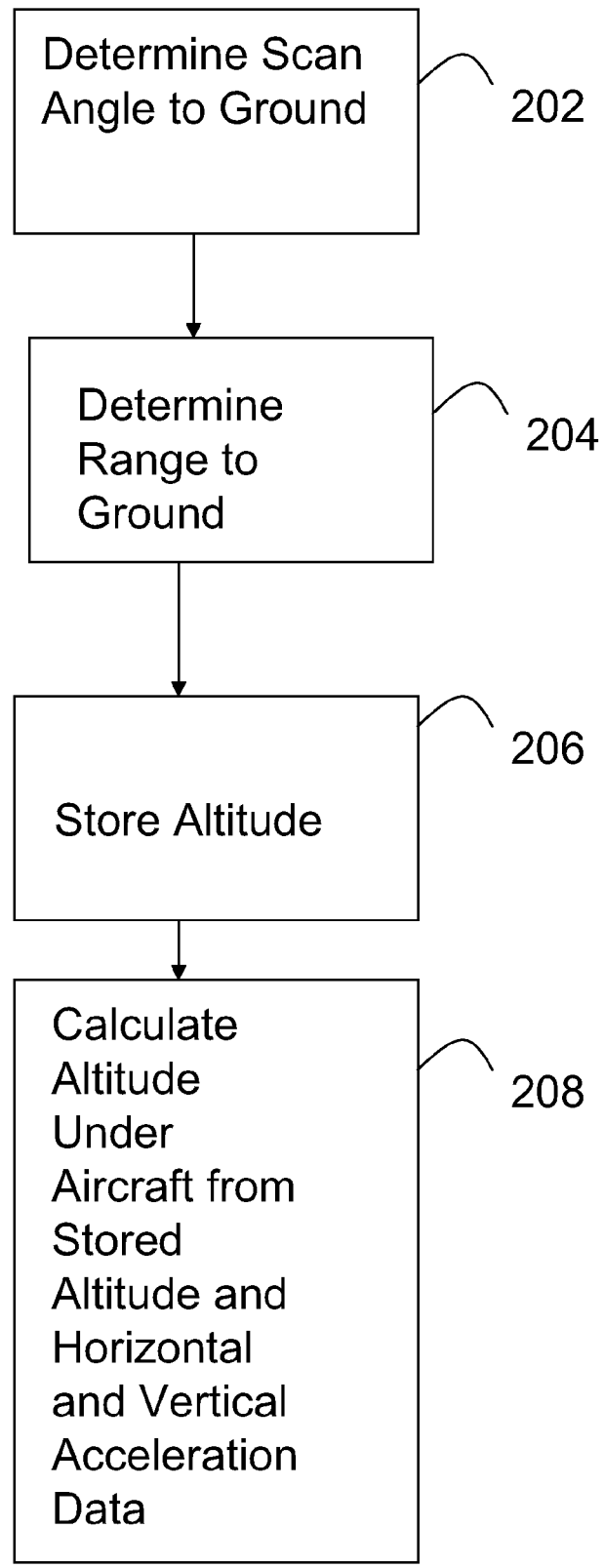
FIG. 6 is a flow chart of a process for calculating altitude using the weather radar system illustrated in FIG. 3, according to an exemplary embodiment.

With reference to FIG. 6, module 126 performs a step 202 to determine theta 304 (e.g., the scan angle) to ground and a step 204 to determine the range to ground. Altitude is calculated and stored in a step 206. In a step 208, altitude under the aircraft can be calculated from the stored altitude and horizontal and vertical acceleration data.

Figure 7:
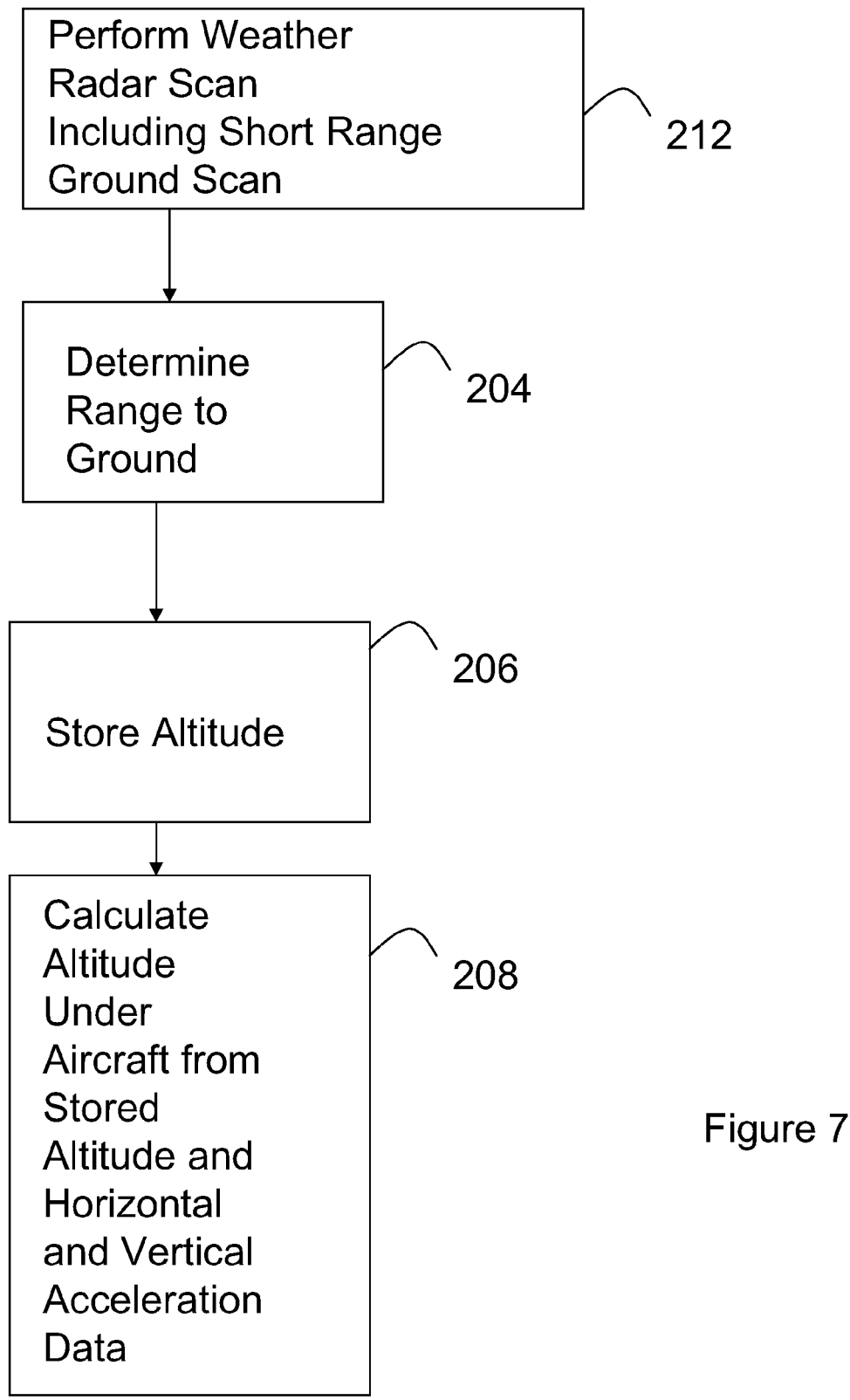
FIG. 7 is a flow chart of a process for using the process illustrated in FIG. 5 during a weather radar sweep in accordance with an exemplary embodiment.
Figure 9:
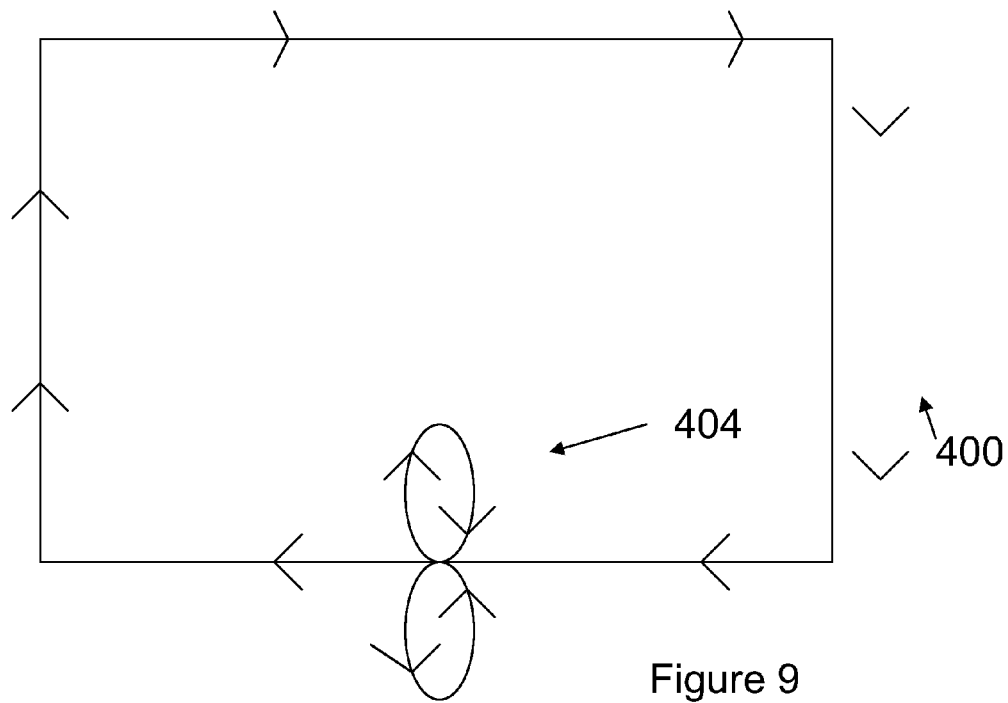
FIG. 9 is an illustration of radar beam sweep generated by the systems and methods described herein, according to an exemplary embodiment.

With reference to FIG. 7, a step 212 may be additionally performed by module 126 for a weather radar scan including a short range ground scan. An exemplary weather radar scan is shown in FIG. 9 as a largely rectangular scan 400 including a vertical or a ground detection portion 404. Additional ground detection portions can be provided. In a preferred embodiment, portion 404 is provided is the center of scan 400 corresponding to the heading or track of the aircraft. Preferably portion 404 has a shape similar to that of FIG. 8 and is provided at a bottom segment of scan 400. Scan 400 can include multiple scans 404 including at a top segment of scan 400. Scan 404 is utilized to detect the presence of the ground. Scan 404 can have a variety shapes and continuations and is shown in an exemplary fashion only.

A terrain map may be generated by altitude module 126. The aircraft movement can be estimated by horizontal and vertical acceleration data to estimate aircraft translation between radar samples. As the aircraft moves, the altitude map under the aircraft can be used to replace the functionality provided by a conventional radio altimeter. Advantageously, such a system allows aircraft that utilize weather radar to have data similar to conventional radio altimeter data without requiring the radio altimeter and its associated requisite holes through the fuselage. Alternatively, module 126 can be used in conjunction with radio altimeters to verify readouts or in conjunction with TAWS to verify operation. Ground approximation can be utilized according to similar algorithm utilized for runway altitude estimation used to support synthetic vision systems and weather radar derived maps utilized by radar terrain avoidance warning systems.

Preferably, altitude module 126 calculates an altitude every 20 seconds or less preferably. In one embodiment, altitude is calculated every 20 second sweep or twice every 20 second sweep. In one embodiment, vertical portion 404 can be performed as part of an ordinary multi-scan sweep. In one embodiment, sweep 404 takes between 8 and 12 seconds. Alternatively, weather radar system 300 can be a monopulse system or sequential lobing system. Preferably, sweep 404 is performed at a short range (e.g., within 15,000 feet) so that small errors are attainable. Preferably, weather radar system 300 provides the altitude to a primary flight display or Electronic Flight Information System ("EFIS"). In a preferred embodiment, system 300 can provide the altitude data on an ARINC 429 bus for use by other devices. In such an embodiment, any device that is ARINC 429 can utilize the altitude information.

While a particular sweep pattern has been illustrated, in other exemplary embodiments, other methods can be used such as a monopulse or a sequential lobing angle estimation technique. Each technique may allow system 300 to remotely determine altitude using weather radar data and aircraft state information. The weather data and state information may be used to align the rotated and translated altitude information to emulate a radio altimeter that would make local estimates of ground altitude directly underneath the aircraft.

While the detailed drawings, specific examples, and particular formulations given describe preferred and exemplary embodiments, they serve the purpose of illustration only. The inventions disclosed are not limited to the specific forms shown. For example, the various functions may be performed in any of a variety of sequence steps, or by any of a variety of hardware and software combinations. The systems and methods depicted and described are not limited to the precise details and conditions disclosed. Furthermore, other substitutions, modifications, changes, and omissions may be made in the design, operating condition and arrangements and be exemplary embodiments without departing from the scope of the invention as expressed in the appended claims.

What is claimed is:

1. A weather radar system on-board an aircraft, the weather radar system comprising:
an antenna interface for coupling to an antenna; and
electronics coupled to the antenna interface, the electronics configured to process return data associated with a radar return received by the antenna from the antenna interface, the radar return being from a location on the ground in front of the aircraft and the electronics configured to determine an altitude directly below the aircraft at the location using the return data, wherein the electronics is configured to use an angle to the location on the ground and a range to the location on the ground determined using the return data to determine a vertical distance between the aircraft and the location, wherein the altitude directly below the aircraft at the location is determined by adjusting the vertical distance in accordance with an aircraft altitude change from a first time when the radar return associated with the location on the ground in front of the aircraft was received and a second time when the aircraft is directly above the location, the aircraft altitude change being determined using at least one data source other than the weather radar system.

2. The weather radar system of claim 1, wherein the return data includes the angle and the range or can be used to derive the angle and the range.

3. The weather radar system of claim 2, wherein the angle is based on heading, scan angle, and depression angle to the ground, and wherein the range is based on a measured two-way propagation time of the radar return.

4. The weather radar system of claim 2, wherein the data source is a GPS or INS source.

5. The weather radar system of claim 4, wherein the altitude directly below the aircraft is computed using vertical INS acceleration data.

6. The weather radar system of claim 5, wherein a difference in horizontal location between the first time and the second time is computed using data derived from a global positioning system, inertial reference system, or other similar system.

7. The weather radar system of claim 6, wherein the difference in horizontal location is computed using a history of ground speed and ground track angle.

8. The weather radar system of claim 1, further comprises: a display coupled to the electronics for displaying the altitude.

9. The weather radar system of claim 1, wherein the radar return is received during a weather radar scan that scans the ground around the aircraft.

10. A method of detecting an altitude of an aircraft above a location on the ground using a cockpit electronic aviation system including a weather radar, the method comprising steps of:
receiving a radar return from the location on the ground in front of the aircraft at a first time using the weather radar;
determining an angle and range to the location on the ground from the weather radar return using the cockpit electronic aviation system;
determining movement parameters related to movement of the aircraft from the first time to a second time when the aircraft is above the location using the cockpit electronic aviation system; and
calculating the altitude directly above the location on the ground using the angle and the range to the location on the ground and the movement parameters using the cockpit electronic aviation system.

11. The method of claim 10, further comprising providing a weather radar scan with a ground scan portion using the weather radar.

12. The method of claim 11, wherein the ground scan portion is at a lower portion on a rectangular scan of the weather radar scan.

13. The method of claim 10, wherein the movement parameters are from a global positioning system, inertial reference system, air data computer system, or other similar system.

14. The method of claim 10, wherein the angle to the location on the ground is based on heading, scan angle, and depression angle to the terrain, and wherein the range to the location on the ground is based on a measured two-way propagation time of the radar returns.

15. The method of claim 10, further comprising displaying the altitude on a display.

16. An apparatus, comprising:
means for providing a beam in front of the aircraft and receiving a weather radar return from a first location; and
means for determining a range and angle to the first location from the weather radar return, wherein the means for determining calculates an altitude directly under the aircraft from the range and angle, the means for determining using vertical movement of the aircraft from a first time when the beam was provided and a second time when the aircraft is located above the first location to calculate the altitude directly underneath the aircraft.

17. The apparatus of claim 16, wherein the apparatus includes a 429 bus output for providing a signal representing the altitude.

18. The apparatus of claim 16, further comprising: means for receiving data from data sources such as an inertial reference system, an air data system, and/or a global positioning satellite system.

19. The apparatus of claim 16, wherein the apparatus is used in an aircraft, the aircraft not including a radio altimeter.

20. The apparatus of claim 16, wherein the apparatus is used to monitor or confirm a radio altimeter measurement or estimate.

* * * * *